Oct. 1, 1957　　　　J. P. WALKER　　　　2,808,123
METHOD AND MEANS FOR TREATING OIL WELL EMULSION STREAMS
Filed April 18, 1955　　　　　　　　　　2 Sheets-Sheet 2
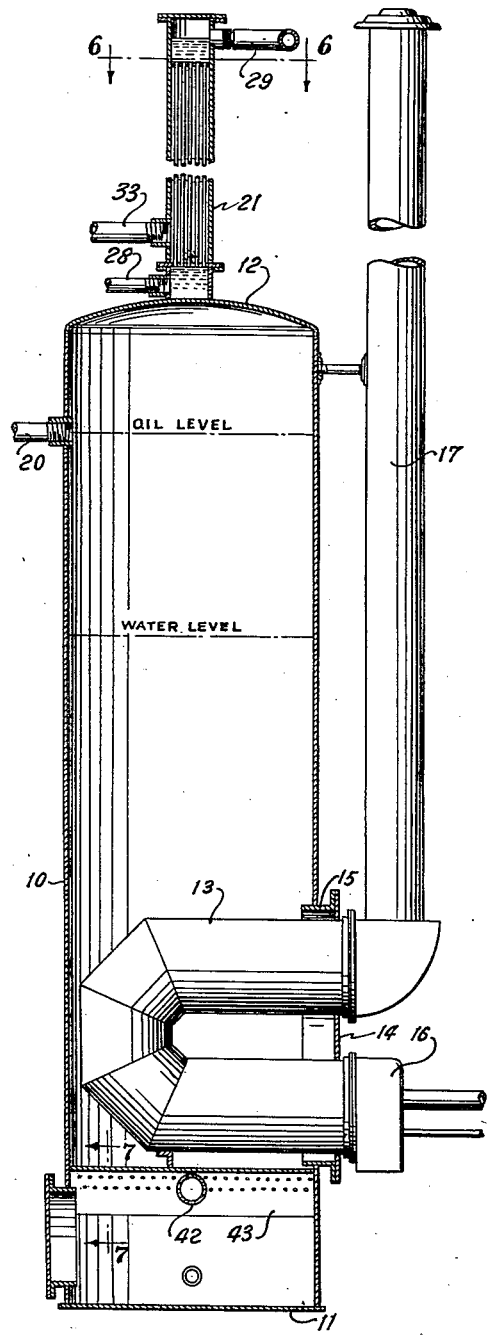
Fig. 4
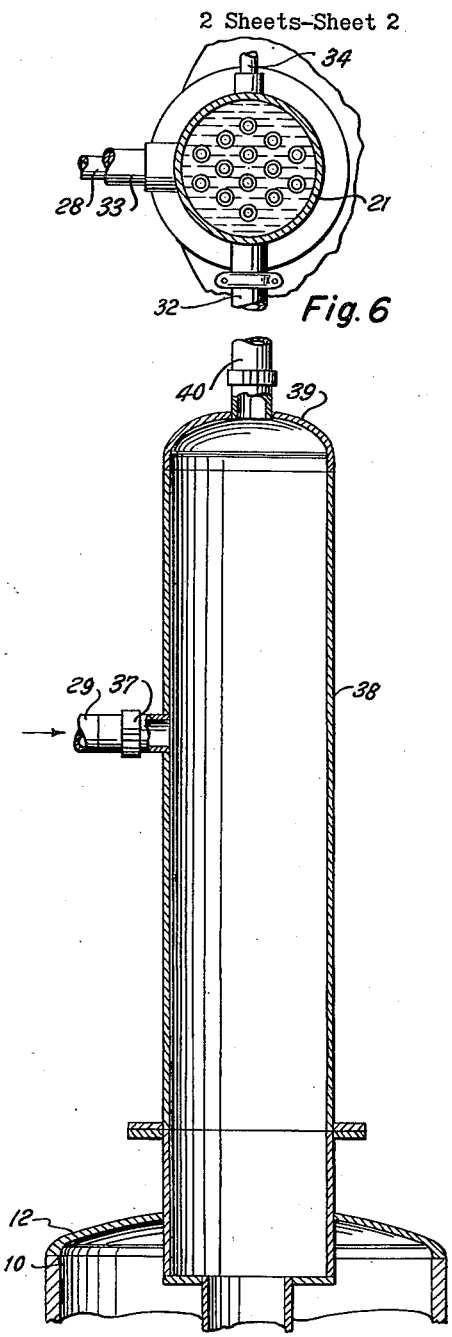
Fig. 6
Fig. 5
INVENTOR
Jay P. Walker
BY Ahley & Ahley
ATTORNEYS United States Patent Office 2,808,123
Patented Oct. 1, 1957

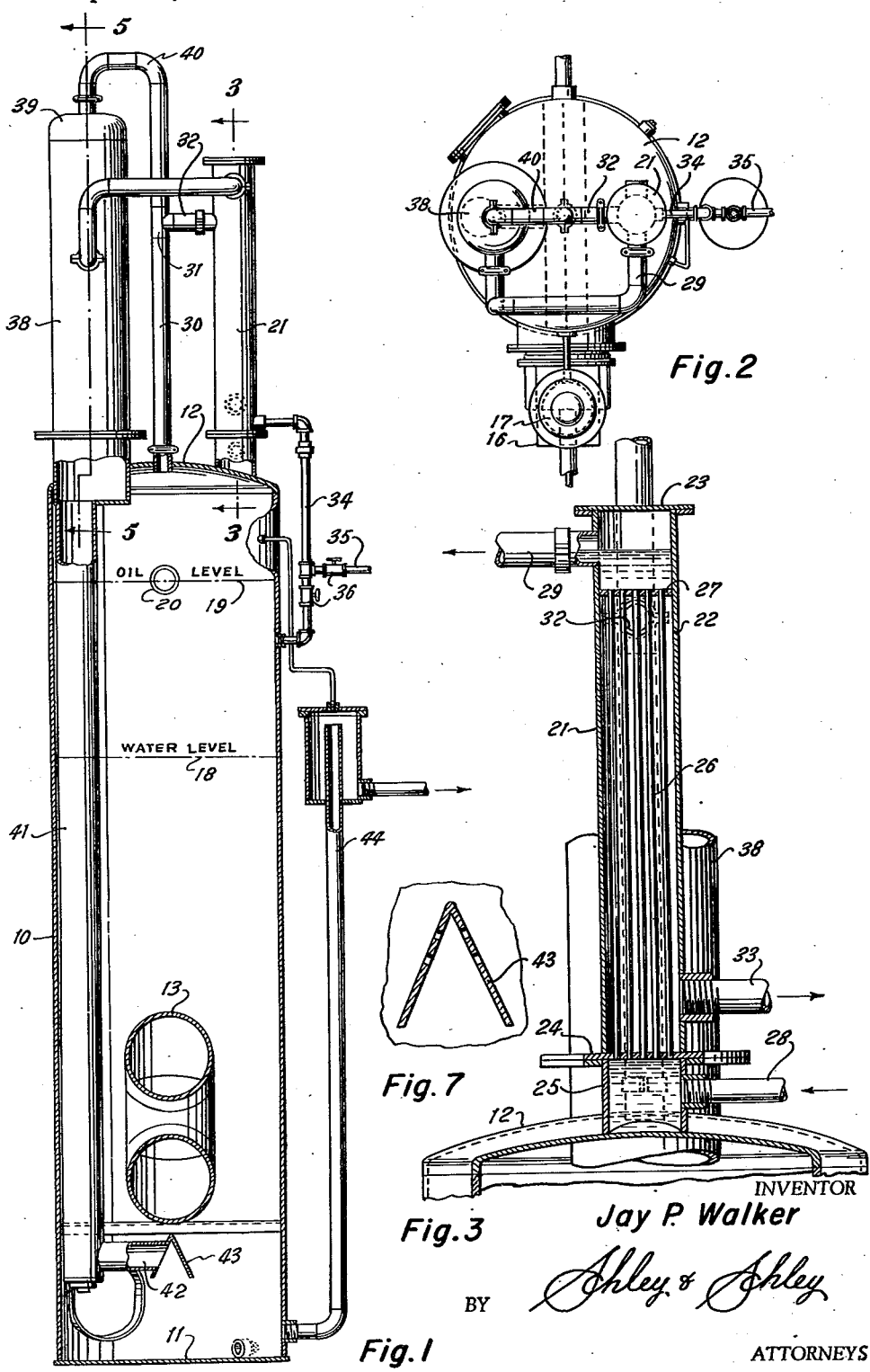

2,808,123

METHOD AND MEANS FOR TREATING OIL WELL EMULSION STREAMS

Jay P. Walker, Tulsa, Okla., assignor to National Tank Company, Tulsa, Okla., a corporation of Nevada Application April 18, 1955, Serial No. 502,112

5 Claims. (Cl. 183—2.7)

This invention relates to new and useful improvements in methods and means for treating oil well emulsion streams.

The invention is directed primarily to the heater type of emulsion treater and is particularly concerned with the efficient and effective condensation of valuable light hydrocarbons from the effluent gas evolved during the heating of the well or emulsion stream. The recovery of such light hydrocarbons and the return thereof to the clean oil withdrawn from the emulsion treater both increases the volume of the recovered oil and increases the gravity of such oil. Thus, more salable oil is recovered, and an oil of higher market value is obtained. At the same time, the wasteful loss of condensable light hydrocarbons in the effluent gas is eliminated, and the likelihood of subsequent condensation of liquids in the effluent gas line, with associated undesirable results, is avoided.

It is, therefore, one object of this invention to provide an improved method and means for treating oil well emulsion streams wherein all of the separated gas is conducted in heat exchange relationship with the incoming well stream prior to heating of the latter in the emulsion treater, the heat exchange being carried out under conditions assuring complete flooding of the heat exchange zone with the well stream to provide most effective cooling of the effluent gas and condensation of hydrocarbons therefrom.

A particular object of the invention is to provide an emulsion treater having a heat exchanger with a well stream inlet at its lower end and a well stream outlet at its upper end whereby the exchanger remains full of the well stream fluid at all times, along with means for passing effluent gas from the treater in heat exchange with the well fluid for cooling of the effluent gas and condensation of hydrocarbons therefrom, either the well stream or the effluent gas being divided into a multiplicity of streams to afford a large heat exchange area between the gas and the well stream for more effective condensation of hydrocarbons from the gas.

A construction designed to carry out the invention will be hereinafter described, together with other features of the invention.

The invention will be more readily understood from a reading of the following specification and by reference to the accompanying drawings, wherein examples of the invention are shown, and wherein:

Fig. 1 is a vertical view, partly in elevation and partly in section, of an emulsion treater constructed in accordance with this invention and adapted to carry out the methods hereof, Fig. 2 is a plan view of the emulsion treater, Fig. 3 is a vertical sectional view taken upon the line 3—3 of Fig. 1, Fig. 4 is a vertical sectional view similar to Fig. 1 and taken at right angles thereto, Fig. 5 is an enlarged, vertical, sectional view taken upon the line 5—5 of Fig. 1, Fig. 6 is a horizontal, cross-sectional view taken upon the line 6—6 of Fig. 4, and Fig. 7 is an enlarged, fragmentary, vertical, sectional view taken upon the line 7—7 of Fig. 4.

In the drawings, the numeral 10 designates an upright, vertical, emulsion treating vessel having a closed bottom 11 and a domed top or head 12. The vessel is provided near its lower end with the usual return-bend fire tube or heating unit 13 mounted upon a plate 14 and extending into the interior of the vessel through a flanged collar 15. A burner unit 16 is provided in the lower leg of the heater, and a stack or flue 17 extends upwardly from the upper legs of the heating unit to a suitable elevation above the head 12 of the treater vessel. As will appear more fully hereinafter, a petroleum well stream containing oil and water emulsion, gas, and possibly some free water and loosely held oil, is released into the vessel below the fire tube and is heated as it rises through the body of liquids normally present in the vessel. Due to the heating, the emulsion is broken or resolved, causing the stream to separate into oil and water components which stratify and seek their respective levels within the vessel. Normally, the lower portion of the vessel 10 is occupied by a body of water standing to a level 18 intermediate the ends of the vessel with a body of clean oil thereabove standing to the level 19 of a clean oil outlet 20 provided in the upper wall of the vessel a short distance below the head 12 of the vessel.

In the heating of the well stream, as well as in the release of the same into the interior of the vessel, quantities of gas will be released to flow upwardly into the space in the vessel above the oil level 19. This gas will consist primarily of methane and the normally gaseous hydrocarbons, but will also carry an appreciable quantity of the readily liquefiable hydrocarbons in the vapor state. These latter hydrocarbons are valuable for increasing both the volume and the gravity of the clean oil, and it is with their recovery that this invention is primarily concerned.

Upon the head 12 of the treater vessel, there is mounted an elongate vertical heat exchanger or condenser 21 shown in detail in Fig. 3 of the drawings. The condenser includes an elongate vertical shell 22 having its upper end closed by a plate 23 and its lower end closed by an apertured plate 24. The shell is supported upon and secured to the upper end of a flanged collar 25 welded or otherwise suitably secured upon the upper surface of the head 12. A plurality of heat exchanger or condenser tubes 26 extend upwardly from the apertures of the plate 24 to similar apertures of a plate or partition 27 extending transversely of the shell 22 below the plate 23. A well stream inlet pipe 28 is connected into the collar 25 beneath the condenser 21, and a well stream outlet pipe 29 extends laterally from the upper end of the shell 22 above the partition 27. Thus, the well stream is caused to enter the condenser at its lower end, to flow upwardly through the tubes 26, and to leave the condenser through the outlet pipe 29. By this arrangement, the condenser is maintained full of the well stream at all times whereby the tubes 26 are constantly flooded with this liquid.

A gas outlet pipe 30 extends upwardly from the head 12 of the treater vessel to a pipe T 31 connected by a pipe 32 into the condenser shell 22 immediately below the partition 27. A gas outlet pipe 33 leads from the lower end of the shell immediately above the plate 24 to a point of gas use or disposal (not shown). Thus, the vapor laden gas exiting from the treater vessel is conducted around and over the outer surfaces of the condenser tubes 26 which present a quite appreciable condensing surface to the gas stream for the condensation of liquefiable hydrocarbons therefrom. The well stream entering the condenser is relatively cool and will maintain the surfaces of the tubes 26 at a temperature low enough to condense appreciable quantities of desirable hydrocarbons from the effluent gas stream. The condensed hydrocarbons collect in the lower portion of the shell 22 and are drained therefrom through a pipe 34 into the treater vessel below the oil level 19 therein. In the alternative, the condensed hydrocarbons may be withdrawn through a branch pipe 35 connected into the pipe 34, suitable valves 16 being provided for directing the flow of the recovered hydrocarbons as desired.

It is quite apparent that the gas stream may be conducted through the condenser shell 22 in either an upward or downward direction, but it has been found most desirable to employ the path of flow which has been described because such flow is countercurrent to the flow of the well stream, and more effective cooling of the effluent gas stream may be obtained. It is also desirable that the flow of the well stream take place through the tubes rather than the shell since the larger volume of the latter will provide a longer retention time for the gas stream passing therethrough. The alternative flow arrangement may be employed, however.

On the other hand, it is important that the flow of the well stream be from the bottom of the condenser to the upper end thereof in order to maintain the condenser flooded or completely filled at all times with the well stream liquid. The advantages of liquid to metal heat transfer rates are thus obtained and insured, and complete wetting of all of the heat exchange surfaces is maintained at all times regardless of the rate of flow of the well stream.

The well stream leaving the condenser 21 through the outlet pipe 29 is conducted through said pipe to the well stream inlet fitting 30 provided in the sidewall of a gas separation enclosure or tower 38 mounted upon the upper end of the vessel 10 and extending downwardly thereinto through the head 12. The gas separation enclosure 38 is provided with a closed upper end 39 from which a gas outlet pipe 40 is connected into the pipe T 31 whereby gas separated from the well stream in the enclosure 30 is conducted from the latter into the condenser 21 along with the gas evolved within the treating vessel 10.

The lower end of the enclosure 38 extends into the upper portion of the treater vessel, and a reduced diameter flume 41 extends downwardly within the vessel from the enclosure to a point beneath the heating unit 13. A lateral conductor 42 leads from the lower end of the flume so as to conduct fluid therefrom into a perforated flow distributor 43 of inverted V cross-section which extends across the lower portion of the treater vessel beneath the heating unit.

The well stream, having been warmed to some extent by heat exchange with the warm gas in the condenser 21, enters the enclosure 38 through the fitting 37, the flow of the well fluid being directed radially of the enclosure, or circumferentially thereof by means of the usual type of flow diverter (not shown) common in this art. The release of the fluid into the relatively large interior of the enclosure 38 and the flow of the fluid over the inner wall of the enclosure provide an effective gas separation action to free the well stream of a considerable portion of its gas content. As previously pointed out, this gas is taken off through the pipe 40 and into the condenser 21.

The separated liquids of the well stream, termed the emulsion stream, flow downwardly through the flume 41 into the pipe 42 and are released by the spreader 43 to flow upwardly in a multiplicity of small, spaced streams over and around the heating unit 13, and through the body of water maintained at an elevated temperature by the immersion of the heating unit therein. The resultant heating and multiple stream flow of the emulsion results in its resolution and separation into oil and water phases which stratify according to their densities within the treater vessel, as pointed out hereinabove. The clean oil is withdrawn through the outlet 20, as previously recited, and separated water is withdrawn in accordance with its rate of accumulation through a conventional water leg structure 44 connected into the treater vessel 10 near its lower end.

With this structure, an extremely simple and reliable emulsion treater is provided having means for passing the well stream through a preliminary gas separation step, for collecting the gas from both the preliminary separation step and the treating step, and conducting the combined gas stream in heat exchange relationship with a flowing body of the incoming well stream to condense valuable hydrocarbons present in the gas in the vapor phase. The recovered hydrocarbons are returned to the oil stratum in the upper portion of the vessel 10 for recovery with the clean oil, or are separately withdrawn through the branch pipe 33.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. An oil well emulsion treater including, a vessel having an emulsion stream inlet, oil and water outlets and a gas outlet, heating means in the vessel for heating the emulsion stream, and a heat exchange enclosure carried by the vessel, the enclosure having a well stream inlet to its lower portion and a well stream outlet from its upper portion whereby the enclosure is maintained flooded with the well stream, conducting means connecting the well stream outlet to the emulsion stream inlet, means defining a gas flow path through the enclosure for conducting gas from the vessel and through the enclosure in indirect heat exchange with the well stream to condense light hydrocarbons from the gas, the well stream inlet and outlet and the emulsion stream inlet being isolated from the oil outlet and forming a part of a flow path for the well stream completely separate from the oil outlet whereby the well stream is withheld from heat exchange relationship with said oil and is utilized solely for cooling gas in the heat exchange enclosure, and means for withdrawing condensed light hydrocarbons from the enclosure and for returning said condensed hydrocarbons to the vessel below the oil outlet thereof.

2. An oil well emulsion treater as set forth in claim 1, wherein the heat exchange enclosure is a tube and shell heat exchanger mounted vertically on the vessel, the well stream inlet and outlet communicating with the tube portion and the shell forming the gas flow path.

3. An oil well emulsion treater including, an upright vertical vessel, an upright vertical heat exchanger carried on the vessel having first and second vertical heat exchange conductors in heat exchange relationship, a well stream inlet to the lower end of the first heat exchange conductor, a gas separation enclosure carried on the vessel, a well stream conductor leading from the upper end of the first heat exchange conductor to the gas separation enclosure, a gas conductor leading from the upper ends of the vessel and the gas separation enclosure to the second heat exchange conductor, means for withdrawing gas and light hydrocarbons condensed therefrom from the second heat exchange conductor, a heater in the vessel, means for conducting the well stream from the gas separation enclosure into the vessel, water and oil outlets from the vessel, and means for returning condensed light hydrocarbons from the second heat exchange conductor to the interior of the vessel below the oil outlet thereof the well stream inlet and conductor being isolated from the oil outlet and forming a part of a flow path for the well stream completely separate from the oil outlet whereby the well stream is withheld from heat exchange relationship with said oil and is utilized solely for cooling gas in the heat exchange enclosure.

4. The method of resolving oil well emulsion stream into gas, oil and water components while recovering light fractions from the gaseous component, including the steps of, passing the well stream upwardly through a well stream-flooded heat exchange enclosure, heating the well stream to a temperature sufficient to break any emulsion present in the stream into water and oil components, withdrawing water and clean oil and withdrawing gas evolved from the heated well stream, conducting the withdrawn gas in indirect heat exchange relationship with the well stream in the heat exchange enclosure to condense light hydrocarbons from said gas, recovering the condensed hydrocarbons, maintaining the well stream isolated from the clean oil and passing it solely in heat exchange with the withdrawn gas and discharging uncondensed gas from the enclosure.

5. The method as set forth in claim 4, wherein one of the group consisting of the well stream and the withdrawn gas is passed in heat exchange with the other of said group in multiple paths in the heat exchange enclosure.

References Cited in the file of this patent

UNITED STATES PATENTS

| | | |
|---|---|---|
| 2,181,685 | Walker | Nov. 28, 1939 |
| 2,181,687 | Walker | Nov. 28, 1939 |
| 2,713,919 | Walker et al. | July 26, 1955 |